3,546,157
FILLED PHENOLIC RESIN COMPOSITIONS CONTAINING A MINOR AMOUNT OF A POLYOLEFIN
Robert S. Mercer, Newark, Del., assignor to Haveg Industries, Inc., Wilmington, Del., a corporation of Delaware
No Drawing. Filed Apr. 25, 1968, Ser. No. 724,231
Int. Cl. C08k 1/78
U.S. Cl. 260—38                                    12 Claims

ABSTRACT OF THE DISCLOSURE

The addition of a small amount of a mono-olefin polymer to a filled phenol-aldehyde resin composition reduces the cracking of the product and improves the chemical resistance.

---

The present invention relates to the preparation of filled phenol-aldehyde resins.

The use of thermosetting phenol-aldehyde resins in molding compositions, of course, is well known. However, there are problems encountered with such compositions. Thus, the molded products frequently crack severely when subjected to heat cycling or after several months of service.

It is an object of the present invention to prepare novel filled phenol-aldehyde resins.

Another object is to reduce the cracking tendency of phenolic resins.

An additional object is to prevent porosity problems in filled phenolic resins.

A further object is to reduce slumping on the mandrel in the working of filled phenolic resins.

Yet another object is to improve the chemical resistance of filled phenolic resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by adding a small amount of mono-olefin polymer having a softening point above 125° C., preferably above 135° C., such as polypropylene, poly-3-methyl butene polymer, or poly-4-methyl pentene, to a filled thermosetting phenol-aldehyde resin. The preferred polymer is polypropylene which is employed in an amount by weight of not over 10%, preferably 1 to 5%, and most preferably 3%, of the total composition.

The filler can be wood flour, walnut shell flour, coconut flour, sawdust or redwood flour but is preferably inorganic, such as silica flour (Cab-O-Sil), coke flour, finely divided graphite, or asbestos, e.g., anthophyllite asbestos and chrysotile asbestos. The filler is used in an amount of 30 to 70% by weight of the total compositions.

The thermosetting phenol-aldehyde resin is made from phenol, cresol, e.g., m-p-cresol mixture, p-cresol or cresylic acid, xylenol with aldehydes such as formaldehyde and furfural. The preferred resin in an alkaline condensed phenol-formaldehyde resin. The phenolic resin is present in an amount of 69 to 30% by weight of the total composition and is desirably at least 7 times the amount of polypropylene, i.e., the polypropylene is not over 14% by weight of the resin, most preferably about 15 times the amount of polypropylene. The formulation prior to molding is preferably worked on a mandrel in conventional fashion, as shown in Ward Pat. 2,835,107, FIGS. 7 and 8.

It was found that by adding small amounts and as much as 49% of polypropylene to an unfilled phenol-formaldehyde resin that the properties of the polypropylene filled resin were not as good as phenol-formaldehyde filled only with inorganic filler such as graphite or asbestos. It was surprising to find that the addition of the small amounts of polypropylene to a filled phenol-formaldehyde resin produced dramatic improvements. Thus it was found that by adding the small amount of polypropylene to filled phenol-formaldehyde resin when filler such as graphite, asbestos, coke flour and silica were employed the problems of porosity and slumping on the mandrel were eliminated.

It was also found that adding the small amount of polypropylene to filled phenol-formaldehyde resins eliminated the severe cracking of molded articles when subjected to either heat cyclic tests or in service tests lasting several months. Also, it was found that it was possible to mold thicker wall sections than previously possible without incurring cracking. Furthermore, better chemical resistance was found. Thus, with inorganic fillers the addition of the polypropylene gave phenol-formaldehyde resin molded products, e.g., tanks, with substantially better resistance to hydrofluoric acid-sulfuric acid mixtures.

Typical examples of suitable phenol-aldehyde resins are shown in Ward Pat. 2,835,107, Lebach Pat. 2,471,631 and Adams Pat. 2,424,787, buth other commercially available thermosetting phenol-aldehyde resins can be employed.

In the specific examples below, finely divided polypropylene was employed. Unless otherwise indicated, all parts and percentages are by weight.

EXAMPLE 1

To 46.5 parts of the phenol-formaldehyde resin prepared in Example 1 of Ward Pat. 2,835,107 there were added 50.5 parts of powdered graphite and 3 parts of polypropylene (Profax 6401, density 0.90). The mixture was then worked on a mandrel, as shown in the Ward patent, and molded to form a tank. After molding, the tank was subject to heat cure at a maximum temperature of 135° C. The tank was subjected to heat cycling tests of alternate 24-hour periods of heating to 135° C. and cooling to room temperature. No cracks were evidenced after ten cycles. The molded product also showed improved resistance to hydrofluoric acid and sulfuric acid compared to a similar phenol-formaldehyde and graphite composition which did not contain polypropylene.

EXAMPLE 2

The procedure of Example 1 was repeated but the graphite was replaced by coke flour. The porosity problem and slumping on the mandrel noted with a similar formulation omitting the polypropylene was overcome by the use of the polypropylene. The molded article did not exhibit cracks after several months of in service use whereas a similar molded product which did not contain polypropylene exhibited cracks in a corresponding time of service.

As employed in the claims, the term "composition" is intended to include the composition both before and after molding.

What is claimed is:
1. A composition comprising a phenol-aldehyde resin, a filler and a minor amount of a mono-olefin polymer selected from the group consisting of polypropylene, poly-3-methyl butene polymer, and poly - 4 - methyl pentene based on the resin, said monoolefin polymer having a softening point above 125° C. and being present in an amount sufficient to reduce cracking of articles molded from the composition.

2. A composition according to claim 1 wherein the mono-olefin is polypropylene.

3. A composition according to claim 2 wherein the filler is an inorganic filler and the resin is a thermosetting 4. A composition according to claim 3 wherein the resin is a phenol-formaldehyde resin.

5. A composition according to claim 4 wherein the phenol is phenol per se.

6. A composition according to claim 5 wherein the composition contains 30 to 70% filler, 30 to 69% phenol-formaldehyde resin and 1 to 10% of polypropylene.

7. A composition according to claim 6 wherein the filler is selected from the group consisting of graphite, coke, silica and asbestos.

8. A composition according to claim 7 wherein the composition contains 46.5% phenol-formaldehyde resin, 50.5% graphite and 3% polypropylene.

9. A composition according to claim 6 wherein the polypropylene is 1 to 5% of the composition and is not over 14% of the resin.

10. A composition according to claim 2 wherein the filler is an inorganic filler and the resin is thermosetting phenol-formaldehyde resin, the composition containing 30 to 70% filler, 30 to 69% resin and 1 to 10% polypropylene.

11. A composition according to claim 10 wherein the polypropylene is 1 to 5% of the composition and is not over 14% of the phenol-formaldehyde resin, the phenol of the resin being selected from the group consisting of phenol and cresol.

12. A composition according to claim 1 wherein the composition contains 30 to 70% filler, 30 to 69% resin and 1 to 10% mono-olefin polymer.

References Cited
FOREIGN PATENTS

| | | | |
|---|---|---|---|
| 940,337 | 5/1937 | Great Britain | 260—844 |
| 2,526,765 | 4/1965 | Japan | 260—874 |

MORRIS LIEBMAN, Primary Examiner

S. M. PERSON, Assistant Examiner

U.S. Cl. X.R.

260—844

PO-1050
(5/69)

UNITED STATES PATENT OFFICE
CERTIFICATE OF CORRECTION

Patent No. __U.S.P. 3,546,157__    Dated __December 8, 1970__

Inventor(s) ___Robert S. Mercer___

It is certified that error appears in the above-identified patent and that said Letters Patent are hereby corrected as shown below:

Col. 1, Line 65 of p.p.; Page 3, Line 26 of spec.
    "in"  -- should read --  "is"

Col. 2, Line 30 of p.p.; Page 5, Line 3 of spec.
    "buth"  -- should read --  "but"

Claim 3, Line 2 in both p.p. and spec.
  cancel "a"

Signed and sealed this 30th day of March 1971.

(SEAL)
Attest:

EDWARD M.FLETCHER,JR.
Attesting Officer

WILLIAM E. SCHUYLER,
Commissioner of Pate